(12) United States Patent  
Lin

(10) Patent No.: US 6,590,854 B2  
(45) Date of Patent: Jul. 8, 2003

(54) READ-WRTE HEAD FINE ADJUSTMENT AND DRIVING STRUCTURE

(75) Inventor: Chih-Chen Lin, Taichung (TW)

(73) Assignee: Gold Summit International Technology Corp., Taichung (TW)

( * ) Notice: Subject to any disclaimer, the term of this patent is extended or adjusted under 35 U.S.C. 154(b) by 158 days.

(21) Appl. No.: 09/949,229

(22) Filed: Sep. 7, 2001

(65) Prior Publication Data

US 2003/0048742 A1 Mar. 13, 2003

(51) Int. Cl.[7] .............................. G11B 7/08; G11B 21/02
(52) U.S. Cl. ..................... 369/249; 369/219; 369/253
(58) Field of Search .................... 369/215, 219, 369/244, 249, 251, 253

(56) References Cited

U.S. PATENT DOCUMENTS 6,192,023 B1 * 2/2001 Seo .............................. 369/219
6,369,963 B1 * 4/2002 Hotta et al. ................... 359/824
6,373,812 B2 * 4/2002 Kim et al. ..................... 369/219
6,445,673 B2 * 9/2002 Park ............................. 369/219

FOREIGN PATENT DOCUMENTS

| JP | 11238232 A | * | 8/1999 | ............ G11B/7/08 |
| JP | 11283253 A | * | 10/1999 | ............ G11B/7/08 |
| JP | 2000011386 A | * | 1/2000 | ............ G11B/7/08 |
| JP | 2000132842 A | * | 5/2000 | ............ G11B/7/08 |
| JP | 2001216658 A | * | 8/2001 | ............ G11B/7/08 |

* cited by examiner

Primary Examiner—William J Klimowicz  
(74) Attorney, Agent, or Firm—Pro-Techtor International Services

(57) ABSTRACT

A read-write head fine adjustment and driving structure includes a disk rotation unit adapted to rotate a disk, a reciprocation unit adapted to reciprocate a read-write head carrying slide along a sliding track relative to the disk rotation unit, a fine adjustment unit adapted to adjust the tilting angle of the sliding track, and an elevation difference compensation unit adapted to compensate elevation difference of the motor of the reciprocation unit when adjusting the tilting angle of the sliding track.

10 Claims, 5 Drawing Sheets

READ-WRTE HEAD FINE ADJUSTMENT AND DRIVING STRUCTURE

BACKGROUND OF THE INVENTION

The present invention relates to disk players and, more specifically, to a read-write head fine adjustment and driving structure for use in a CDROM player, DVDROM player RW player, VCD player, DVD player, or MP3 player adapted to adjust the angular position of the read-write head and to move it relative to the disk.

Regular disk players, fore example, DVD or MP3 player uses a read-write head to read and write data, and a fine adjustment mechanism to adjust the angular position of the read-write head. When a disk player assembled, an experienced engineer must adjust the read-write head to the accurate angular position. This read-write head adjustment procedure takes much time. Further, a disk player uses a driving mechanism to move the read-write head during reading or writing. The driving mechanism of a known disk player comprises a motor, a screw rod fastened to the read-write head holder, and a transmission gear set coupled between the output shaft of the motor and the screw rod. The engagement arrangement between the screw rod and the read-write head holder is high precision structure, which greatly increases the manufacturing cost of the disk player. Further, in order to achieve smooth transmission between the screw rod and the read-write holder, a clearance must be left therebetween. However, the presence of this clearance may affect the precision of the reading angle of the read-write head, and a small vibration may force the read-wire head out of position.

SUMMARY OF THE INVENTION

The present invention has been accomplished to provide a read-write head fine adjustment and driving structure, which eliminates the aforesaid drawbacks. It is therefore the main object of the present invention to provide a read-write head fine adjustment and driving structure, which is inexpensive to manufacture and easy to install. It is another object of the present invention to provide a read-write head fine adjustment and driving structure, which greatly improves the performance of the read-write head. To achieve these and other objects of the present invention, the read-write head fine adjustment and driving structure comprises a disk rotation unit adapted to rotate a disk, a reciprocation unit adapted to reciprocate a read-write head carrying slide along a sliding track relative to the disk rotation unit, a fine adjustment unit adapted to adjust the tilting angle of the sliding track, and an elevation difference compensation unit adapted to compensate elevation difference of the motor of the reciprocation unit when adjusting the tilting angle of the sliding track. The reciprocation unit comprises a sliding track, a slide holding the read-write head, a motor adapted to reciprocate said slide along the sliding track, and a transmission gear set coupled between the output shaft of the motor and the slide

DETAILED DESCRIPTION OF THE PREFERRED EMBODIMENT

Figure 1:
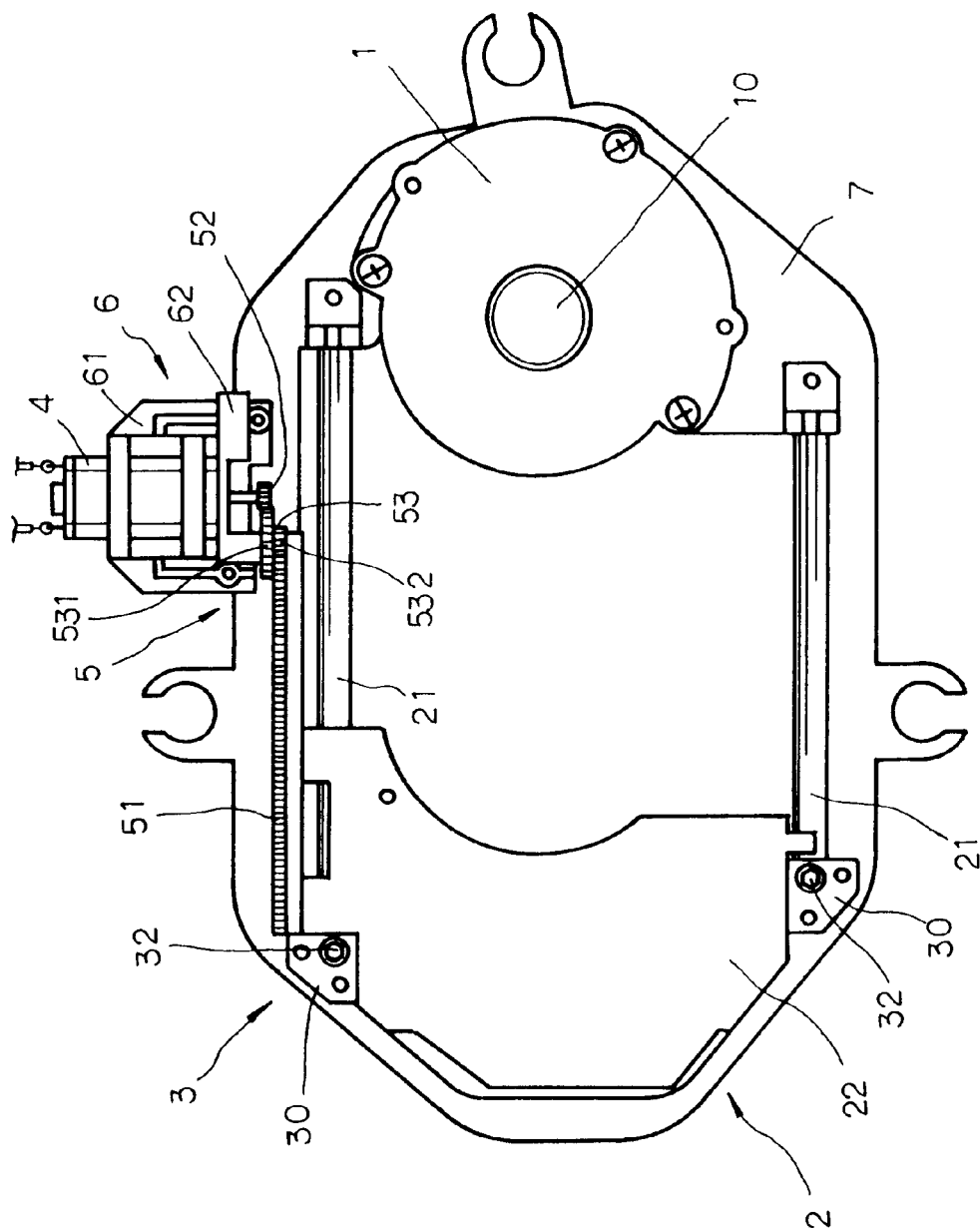
FIG. 1 is a top plain view of a read-write head fine adjustment and driving structure according to the present invention.
Figure 2:
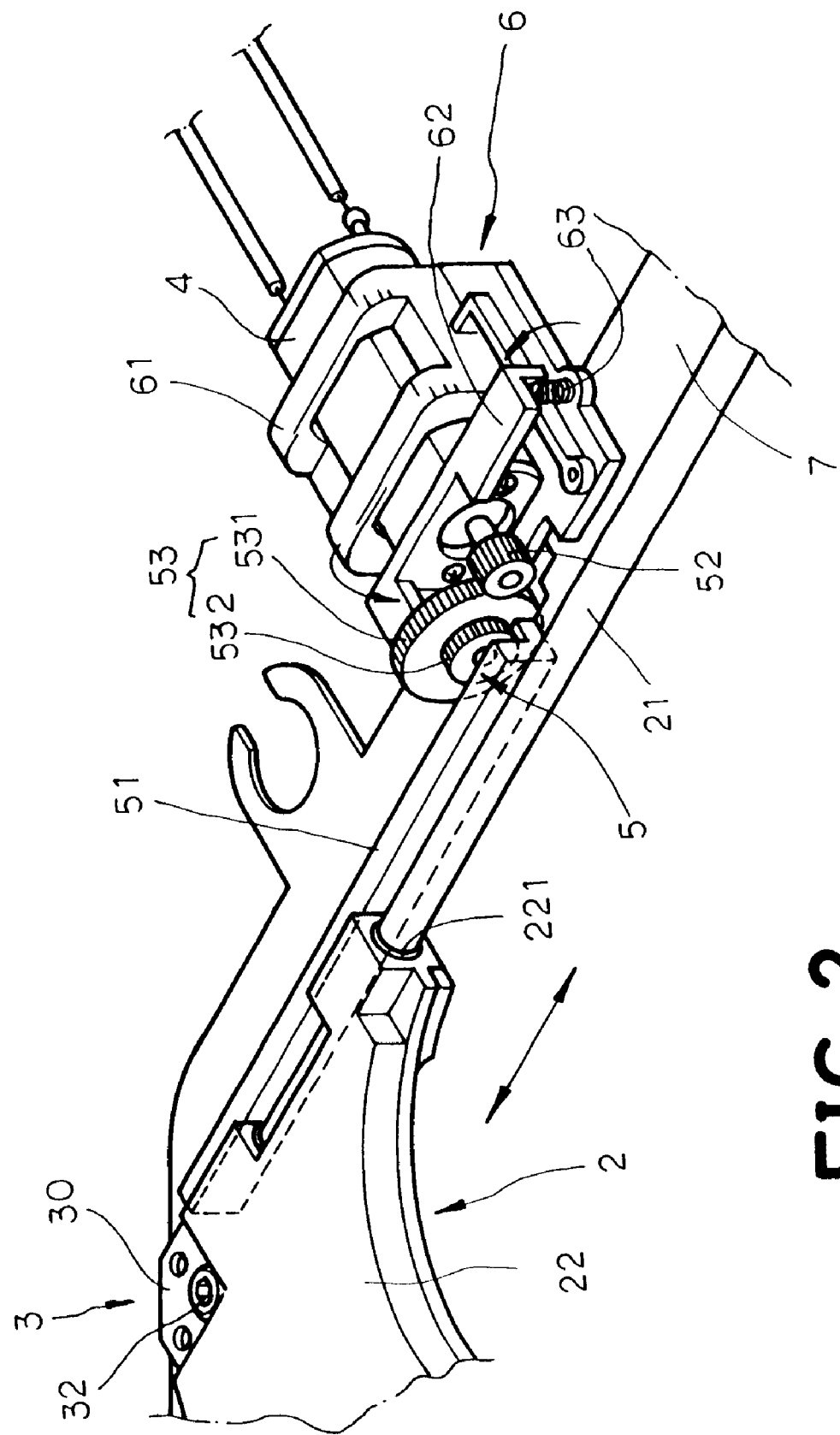
FIG. 2 is a perspective view of in an enlarged scale of a part of the read-write head fine adjustment and driving structure shown in FIG. 1.
Figure 3:
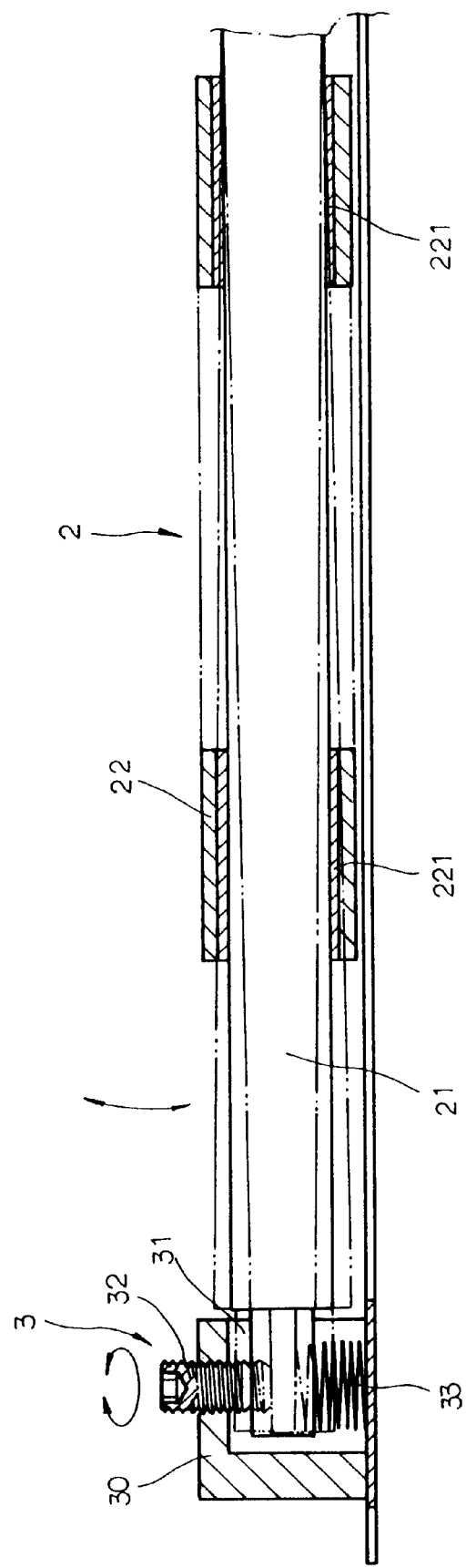
FIG. 3 is a sectional view in an enlarged scale of a part of the present invention showing the arrangement and adjustment action of the fine adjustment unit.
Figure 4:
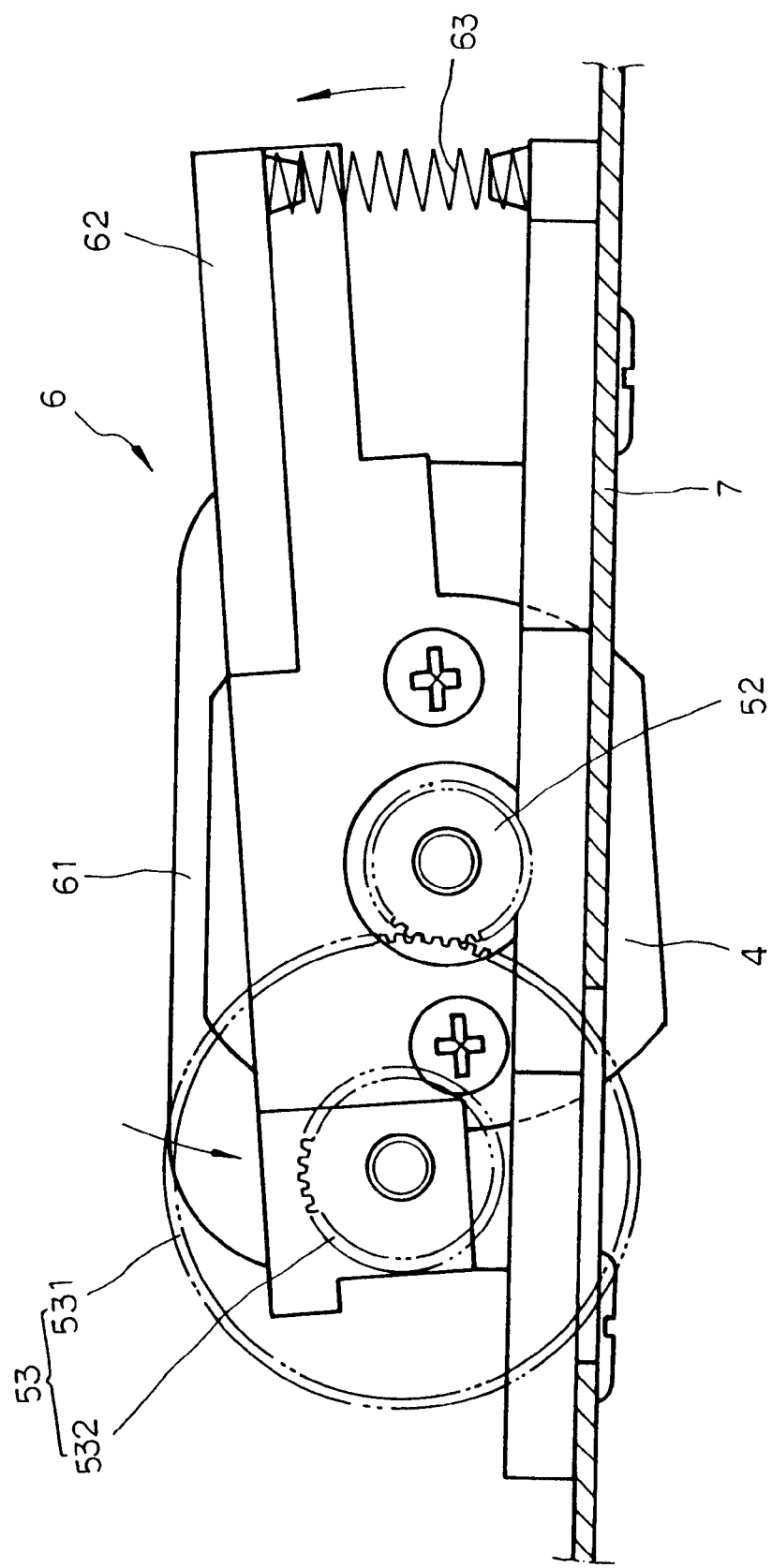
FIG. 4 is a front view in an enlarged scale of a part of the present invention showing the arrangement and adjustment action of the elevation difference compensation unit.

Referring to FIGS. from 1 through 5, a read-write head fine adjustment and driving structure in accordance with the present invention is mounted on a base frame 7, comprising:

a disk rotation unit 1, the disk rotation unit 1 comprising a motor drive 10 adapted to rotate a disk (see FIG. 1);

a reciprocation unit 2 disposed at one side of the disk rotation unit 1, the reciprocation unit 2 comprising a horizontal sliding track 21, a slide 22 holding a read-write head (not shown) and supported on the horizontal sliding track 21, a motor 4 adapted to reciprocate the slide 22 along the horizontal sliding track 21 relative to the disk rotation unit 1, and a transmission gear set 5 coupled between the output shaft of the motor 4 and the slide 22, the transmission gear set 5 comprising a rack 51 fixedly fastened to one side of the slide 22 and disposed in parallel to the horizontal sliding track 21, a driving gear (pinion) 52 fixedly mounted on the output shaft of the motor 4, and at least one driven gear 53, for example, a first driven gear 531 meshed with the driving gear 52 and a second driven gear 532 meshed between the first driven gear 531 and the rack 51 (see FIGS. 1, 2, and 4);

A fine adjustment unit 3 adapted to adjust the tilting angle of the sliding track 21 of the horizontal reciprocation unit 2, the fine adjustment unit 3 comprising two sliding track holders 30, a plurality of spring means (compression springs, polyurethane elements, rubbers, or the like) 33 respectively mounted inside the sliding track holders 30 at a bottom side and supporting one side of the sliding track 21 in the sliding track holders 30 (the other side of the sliding track 21 is pivoted to the base frame 7), and two fine adjustment screws 32 respectively vertically mounted in the sliding track holders 30 at a top side and stopped at the sliding track 21 against the spring means 33 (see FIGS. 1 and 3);

an elevation difference compensation unit 6, the elevation difference compensation unit 6 comprising a motor mount 61 holding the motor 4 of the reciprocation unit 2 for enabling the body of the motor 4 to be freely rotated, spring means 63, for example, compression springs, polyurethane elements, rubbers, or the like, and an elevation differential device 62 fixedly fastened to the body of the motor 4 and adapted to rotate the body of the motor 4 of the reciprocation unit 2, the elevation differential device 62 having one side pivoted to the first driven gear 531 and the other side supported on the spring means 63 (see FIGS. 1, 2, and 4).

Figure 5:
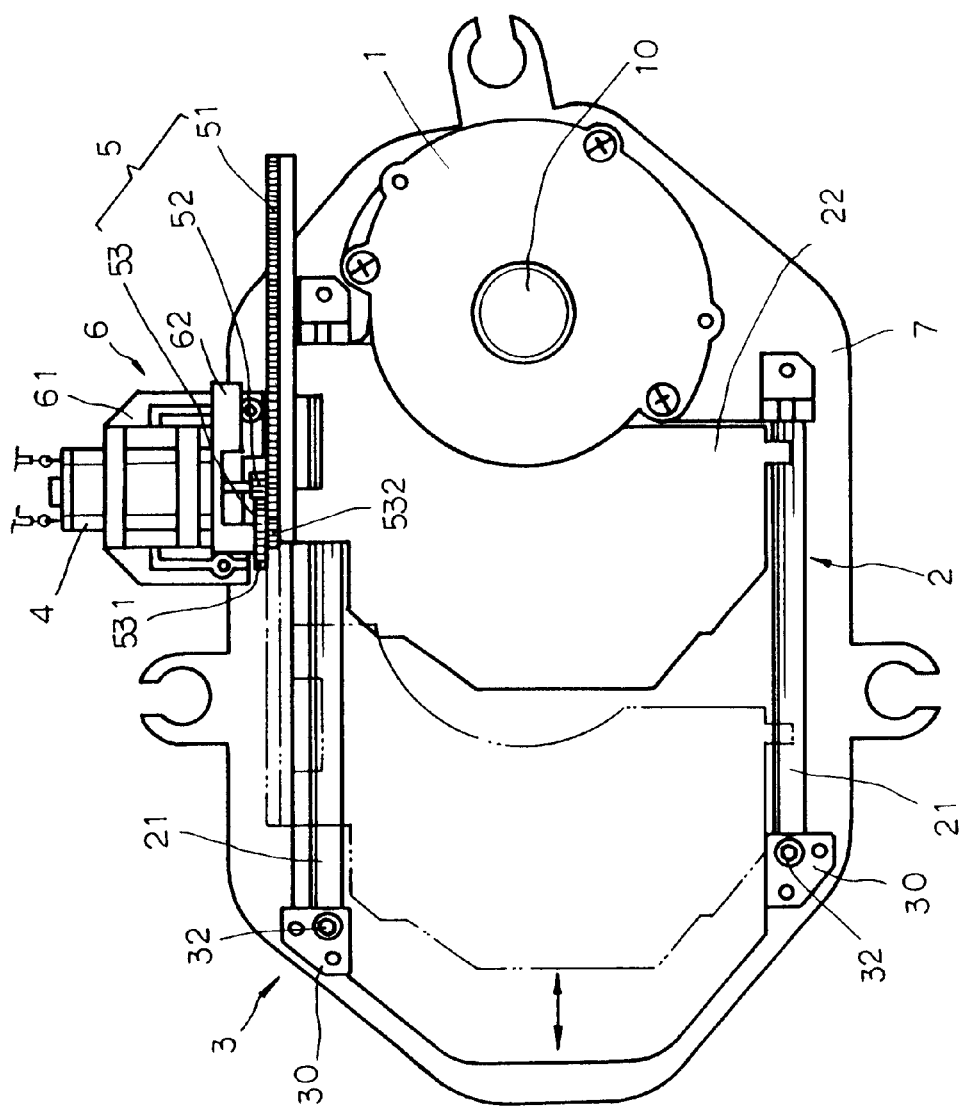
FIG. 5 is similar to FIG. 1 but showing the reciprocation unit operated.

When rotating the fine adjustment screws 32 downwards or upwards, the tilting angle of the sliding track 21 is relatively adjusted. When adjusting the tilting angle of the sliding track 21, the elevation differential device 62 is forced by the spring means 63 to rotate the body of the motor 4 of the reciprocation unit 2 in the reversed direction to compensate elevation difference, keeping the second driven gear 532 meshed with the rack 51 (see FIGS. 1 and 4). When starting the motor 4 of the reciprocation unit 2, the driving gear 52 drives the first driven gear 531 and then the second driven gear 532, thereby the second driven gear 532 to move the rack 51 and the slide 22 along the sliding track 21 (see FIG. 5).

Referring to FIGS. 2 and 3, axle bushes or bearings 221 are coupled between the slide 22 and the sliding track 21 for enabling the slide 22 to be smoothly reciprocated on the sliding track 21.

A prototype of read-write head fine adjustment and driving structure has been constructed with the features of FIGS. 1~5. The read-write head fine adjustment and driving structure functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A read-write head fine adjustment and driving structure comprising:

a disk rotation unit, said disk rotation unit comprising a motor drive adapted to rotate a disk;

a reciprocation unit disposed at one side of said disk rotation unit, said reciprocation unit comprising a sliding track, a slide holding a read-write head and supported on said sliding track, a motor having a body and an output shaft and adapted to reciprocate said slide along said sliding track relative to said disk rotation unit, and a transmission gear set coupled between the output shaft of the motor of said reciprocation unit and said slide, said transmission gear set comprising a rack fixedly fastened to one side of said slide and disposed in parallel to said sliding track, a driving gear fixedly mounted on the output shaft of the motor of said reciprocation unit, and at least one driven gear coupled between said driving gear and said rack;

a fine adjustment unit adapted to adjust the tilting angle of said sliding track of said reciprocation unit; and an elevation difference compensation unit, said elevation difference compensation unit comprising a motor mount holding the motor of said reciprocation unit, spring means, and an elevation differential device fixedly fastened to the body of the motor of said reciprocation unit and adapted to rotate the body of the motor of said reciprocation unit, said elevation differential device having one side pivoted to one driven gear of said transmission gear set of said reciprocation unit and an opposite side supported on the spring means of said elevation difference compensation unit.

2. The read-write head fine adjustment and driving structure as claimed in claim 1 further comprising a base frame, which supports said disk rotation unit, said reciprocation unit, said fine adjustment unit, and said elevation difference compensation unit.

3. The read-write head fine adjustment and driving structure as claimed in claim 1 wherein said at least one driven gear of said transmission gear set of said reciprocation unit comprises a first driven gear meshed with said driving gear, and a second driven gear meshed between said first driven gear and said rack.

4. The read-write head fine adjustment and driving structure as claimed in claim 1 wherein the spring means of said elevation difference compensation unit is a compression spring.

5. The read-write head fine adjustment and driving structure as claimed in claim 1 wherein the spring means of said elevation difference compensation unit is a rubber member.

6. The read-write head fine adjustment and driving structure as claimed in claim 1 wherein said fine adjustment unit comprises two sliding track holders, a plurality of spring means respectively mounted inside said sliding track holders at a bottom side and supporting one side of said sliding track in said sliding track holders for enabling an opposite side of said sliding track to be pivoted to a base frame, and two fine adjustment screws respectively vertically mounted in said sliding track holders at a top side and stopped at said sliding track against the spring means of said fine adjustment unit.

7. The read-write head fine adjustment and driving structure as claimed in claim 6 wherein the spring means of said fine adjustment unit are compression springs.

8. The read-write head fine adjustment and driving structure as claimed in claim 6 wherein the spring means of said fine adjustment unit are rubber members.

9. The read-write head fine adjustment and driving structure as claimed in claim 1 wherein said reciprocation unit further comprises a plurality of axle bushes coupled between said slide and said sliding track and adapted to guide reciprocation motion of said slide on said sliding track.

10. The read-write head fine adjustment and driving structure as claimed in claim 1 wherein said reciprocation unit further comprises a plurality of axle bearings coupled between said slide and said sliding track and adapted to guide reciprocation motion of said slide on said sliding track.

* * * * *